Figure 3:
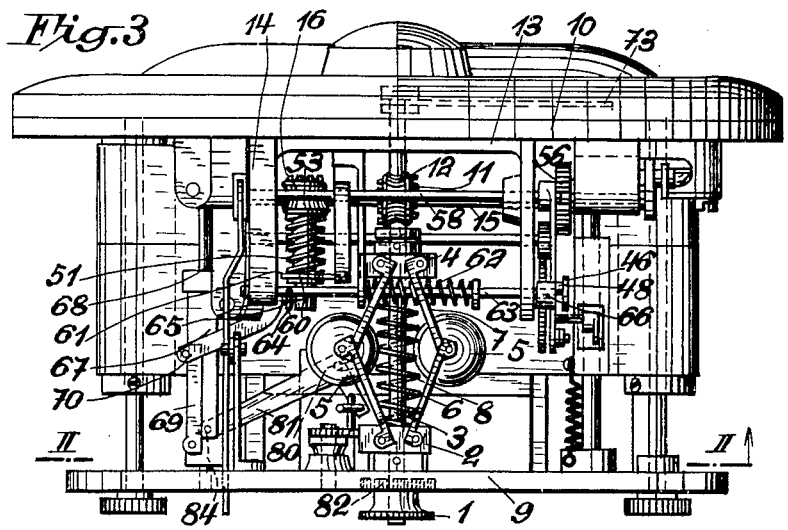

Dec. 16, 1958  A. BAUER  2,864,603
DEVICE FOR INDICATING AND RECORDING THE DISTANCE AND
SPEED OF TRAVEL OF MOTOR VEHICLES
Filed June 28, 1955  3 Sheets-Sheet 1

INVENTOR.
Alfons Bauer
BY
Michael S. Striker
agt.

Dec. 16, 1958
A. BAUER
2,864,603
DEVICE FOR INDICATING AND RECORDING THE DISTANCE AND
SPEED OF TRAVEL OF MOTOR VEHICLES
Filed June 28, 1955
3 Sheets-Sheet 2
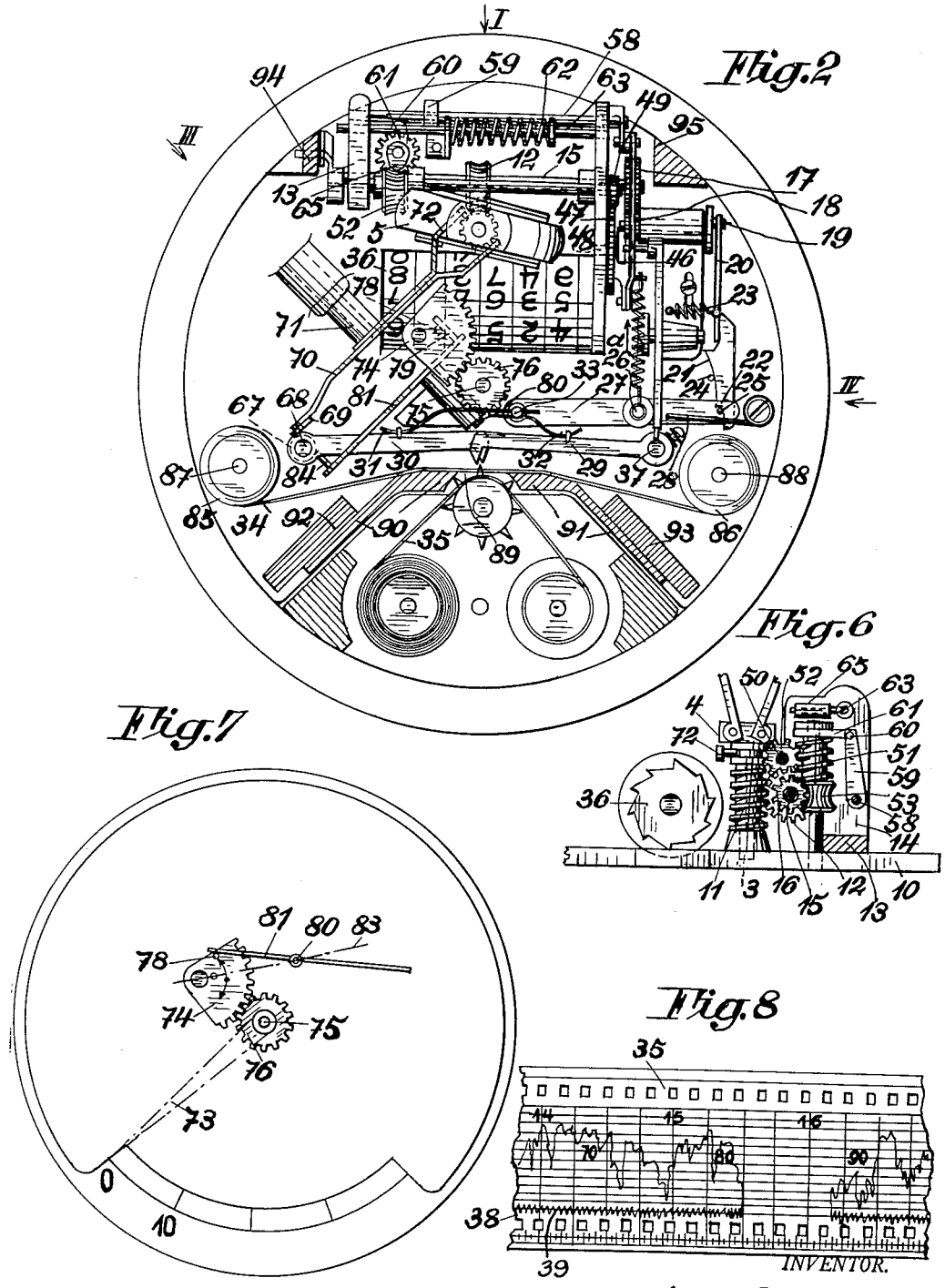
INVENTOR.
BY Alfons Bauer
Michael S. Striker
agt.

Dec. 16, 1958             A. BAUER             2,864,603
DEVICE FOR INDICATING AND RECORDING THE DISTANCE AND
SPEED OF TRAVEL OF MOTOR VEHICLES
Filed June 28, 1955                           3 Sheets-Sheet 3

INVENTOR.
Alfons Bauer
BY
Michael S. Striker
agt.

United States Patent Office 2,864,603
Patented Dec. 16, 1958

2,864,603

DEVICE FOR INDICATING AND RECORDING THE DISTANCE AND SPEED OF TRAVEL OF MOTOR VEHICLES

Alfons Bauer, Graz, Steiermark, Austria

Application June 28, 1955, Serial No. 518,587

Claims priority, application Austria July 8, 1954

3 Claims. (Cl. 264—1)

This invention relates to an improvement in a device for indicating and recording the distance and speed of travel of motor vehicles. This device comprises a record carrier, which can be moved forward by clockwork at regular speed, and two recording levers, one of which can be controlled by the pendulum governor of the device, which is coupled to the drive or road wheel of the vehicle, whereas the other one can be controlled by the odometer for recording the distance travelled.

An essential feature of the device resides in the fact that for making dot records the recording levers with their nibs can be moved jointly against the paper strip in intervals for short times by a mechanical or electromagnetical control device, the intervals of time between successive dots being determined by the odometer or its worm gear drive in dependence on the speed of travel.

To achieve on the one hand a most accurately linear control of the speed indicating pointer and to improve on the other hand the control elements serving for the dotwise recording regarding their functional reliability and the distinctiveness of the records made, the device is improved according to the invention thereby that the recording lever controlled by the pendulum governor in dependance on the speed of travel is operatively connected to the speed indicating pointer by a control device which almost compensates the progressively decreasing lift of the pendulum governor, and that both recording levers are positively connected to a control lever, which is independent of both control movements (recording of speed and distance of travel) and which can be retracted against the action of a spring, which can be stressed for dotwise recording. Said control lever is controlled by a control device, which is driven independently of the pendulum governor, to perform striking movements under a resilient force for dotwise recording at regular intervals.

This ensures not only an exact speed indication but also a recording of all phases of movement of the vehicle on a perfectly linear scale.

The drawing shows an illustrative embodiment of a device for indicating and recording the distance and speed of travel of motor vehicles, which is constructed according to the invention.

Figure 1:
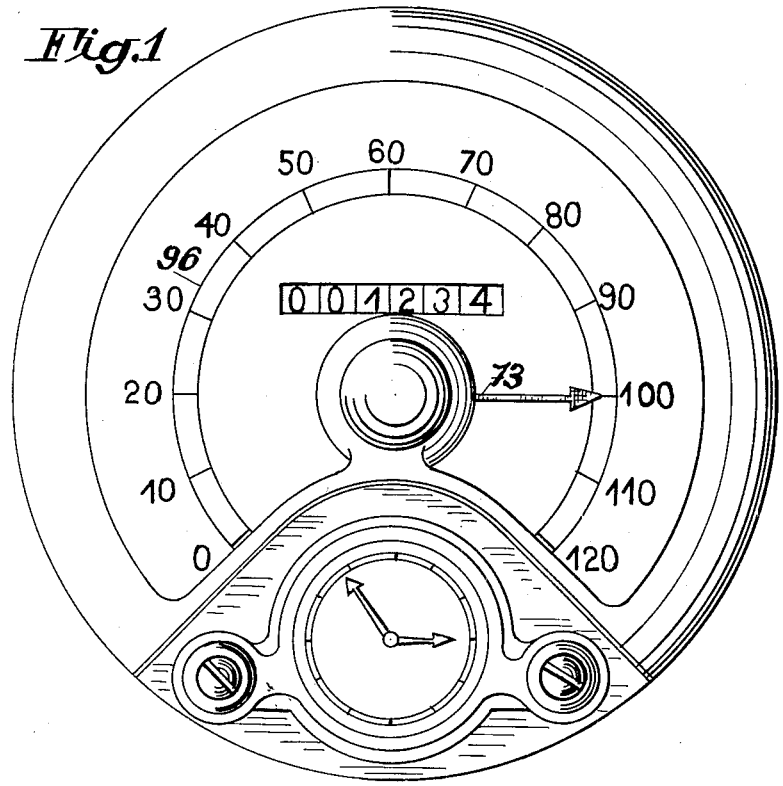
Figure 4:
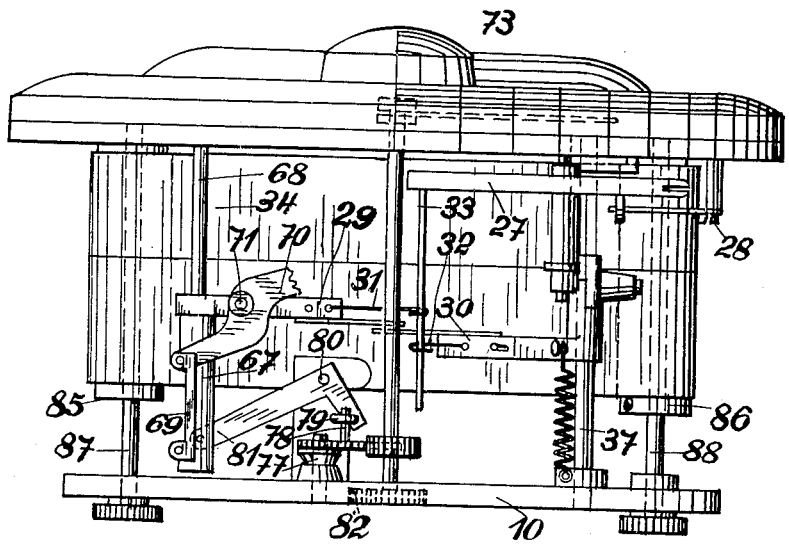
Figure 5:
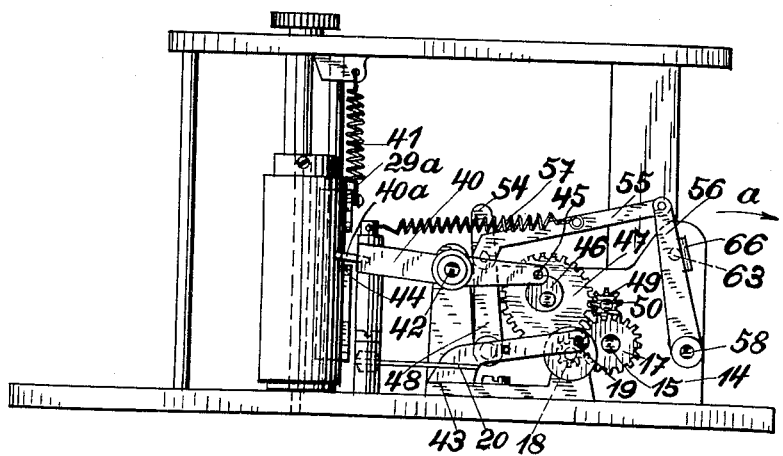

Fig. 1 is a front view of the device. Fig. 2 is a cross-sectional view of the device, taken just below the rear plate bar on line II—II of Fig. 3. Fig. 3 is a side view taken in the direction of arrow I of Fig. 2 and showing the gear unit of the device. Fig. 4 is a side view taken in the direction of arrow II and showing the recording levers for the ink ribbon and the control means for the pointer, whereas the other elements have been omitted. Fig. 5 is another side view, taken in the direction of arrow IV of Fig. 2 and showing the gear unit. Fig. 6 is a sectional view showing an important part of the gear block with view showing the odometer mechanism. Fig. 7 is a diagrammatic view of the gear unit for the pointer. Fig. 8 shows a portion of a recording tape.

The pendulum governor is driven through a gear 1 by a speed reducer (not shown), which is coupled to the drive. One hub 2 of the pendulum governor is fastened on its shaft 3, whereas its second hub 4 is axially movably fitted on the shaft 3. The arms 6, 7 carrying the pendulum weight 5 control the hub 4 in dependence on the speed of shaft 3 against the action of the spring 8 mounted on said shaft. The shaft of the pendulum governor is rotatably carried in the plate bars 9, 10. It is of extremely high importance for the functional reliability of the control mechanism that the pendulum weights 5 are guided accurately parallel to themselves in a radial plane of shaft 3 during their swing. To this end the pendulum weights 5 are supported on two sides and guided parallel to themselves by four pairs of arms 6, 7 so that they cannot move out of their prescribed radial plane in any phase of their movement. Thus the weights 5 are freed from undesired vibration. The shaft 3 of the pendulum governor carries close to one of its ends a worm 11 in mesh with a worm wheel 12 of a bearing block 13, in whose bearing plates 14 the shaft 15 of the worm wheel 12 is rotatably carried. This shaft 15 carries also a worm 16 inside the bearing block 13 and carries at its free end a gear 17 outside the bearing block 13. The gear 17 is in mesh with a pinion 18 to drive a crank 19 which causes a reciprocating of a pawl 20. The pawl 20 has a control projection 21 and at its end it has a driving tooth 22. A spring 23 is stationary at one end and urges the pawl 20 against a stop 24, which is fixed to one of the plate bars 9, 10 adjacent to the control projection 21. The driving tooth 22 of the pawl 20 engages a pin 25 of a two-armed control lever 27 oscillating on a rigid shaft 26 and held in or returned to its initial position by a spring 28. To control the recording levers 29, 30 for making dot records that control lever 27 is moved by the advancing pawl 20 engaging the pin 25 with the driving tooth 22 until the control projection 21 sliding along the stop 24 disengages the driving tooth 22 from the pin 25 of control lever 27 so that the latter can spring into its recording position under the action of spring 28. Each of the two recording levers 29, 30 has a resilient hook 31, 32 embracing a driving rod 33, which extends at right angles from the control arm 27 and transmits the movement of the control lever 27 to the recording levers 29, 30. The nibs of the recording levers 29, 30 are normally spaced behind the ink ribbon 34 to avoid damage to the moving ink ribbon by the nibs of the recording levers 29, 30. When the control lever 27 is retracted by the pawl 2L it will carry the recording levers 29, 30 along with the aid of the resilient hooks 31, 32 and will subsequently strike them under the action of its spring 28 against the ink ribbon 34 and the record tape 35 for recording two dots. Thus the dotwise recording is effected safely and in an exact manner under all operating conditions and independently of impacts and shocks, but in dependence on the speed of the pendulum governor, in a succession which is determined by the transmission ratio provided by the worm gear 11, 12 and the gear train 17, 18. Thus a dot is recorded on the record tape after each increment of, e. g., 5 metres of travel.

The recording lever 29 of the odometer 36 is pivotally movable about a rigid shaft 37, which is parallel to the paper web of a record tape 35. The lever 29 is also movable on that shaft parallel to itself. The pivotal movement of the recording lever 29 is effected by the control lever 27 described hereinbefore for making dot records. The translation of the recording lever 29 of the odometer 36, however, is effected within a track 38, which is, e. g., about 5 millimeters wide, of the record tape 35 (Fig. 8). This track serves for recording the distance travelled. Thus a zig-zag line 39 is recorded. Each stroke of the recorded line corresponds, e. g., to a travel of 500 metres and the record tape 35 driven by a clockwork indicates by closely spaced zig-zag lines 39 that the vehicle has travelled at high speed and by widely spaced zig-zag lines 39 that it had only a moderate speed. For the recording of dots this recording lever 29 is moved by a two-armed control lever 40 against the action of a spring 41, which tends to return the recording lever 29 to its initial position to maintain a perfect engagement between the control lever 40 and the recording lever 29. The control lever 40 is pivotally movable about a stationary pin 42 of a bearing block 43 and one of its arms has a pin-shaped end 40a, which enters a rest 44 provided in the recording lever hub 29a. The other arm of the lever 40 carries a pin 45 extending at right angles from its end and resting on the periphery of a revolving cam 46, which is rigidly connected to a gear 47. The gear 47 is freely rotatably mounted on a rigid pin 48 and is driven by a pinion 49, which is affixed to the end of a shaft 50 rotatable in bearing block 13. That shaft 50 is positively connected through two worm gears 51, 52 and 53, 16 to that shaft 15 which carries the gear 12 in mesh with the worm 11 of the pendulum governor. The two worm gears 51, 52 and 53, 16 and the gear train 49, 47 provide for such a transmission ratio that the cam 46 will make one turn about its rigid shaft 48 for each kilometre travelled. Thus the recording lever 29 recording the distance of travel is advanced and returned once by means of its control lever 40 moved by the cam 46 and is caused thereby to record a dotted zig-zag line 39. At the same time the distance travelled is registered in the counter 36 by means of a stepping arm 54, which is carried on the counter shaft and is connected by a link 55 to a second control arm 56 and is returned to or held in its initial position by a cocking spring 57, which engages with one end the link 55 and with the other end the shaft 26 of the control lever 27. The second control arm 56 is carried on a shaft 58, which carries a control finger 59, which has a pin 60 engaging a control cam 61 of the worm gear 51, 52. That cam 61 causes a pivotal movement of the finger 59 in the sense of arrow a (Fig. 5) against the force of the spring 57 for one step of the counter 36. Thus the finger 59 is cocked. To enable the stepping movement of the counter 36 this pair of control levers 54, 56 is temporarily held in its cocked position by a special locking device. This locking device consists of a locking pin 63, which is carried in the bearing block 13 so as to be axially slidable against the action of a spring 62 and which has a radially extending arm 64 engaging the periphery of a cam 65 of the worm gear 51, 52. That locking pin 63 is held by the spring 62 in its locking position, in which the end of the pin extends into the range of movement of a stop 66 extending from the control lever 56 and prevents that lever from moving back out of its extreme cocked position. The two control cams 61, 65 are angularly spaced so that the cam 65 actuating the locking pin 63 lags behind the other cam 61, which cocks the control levers 54, 56, by such an angle as to ensure the stepping movement of the counter 36. This stepping movement will be performed as soon as the cam 61 has moved past the range of swing of the control finger 59 and the other cam 65 has disengaged by means of the apex of its curvature and the arm 64 the locking pin 63 from the stop 66 of the control lever 56 against the force of the spring 62; now the control lever 56 acting jointly with the other lever 54 will automatically cause a stepping movement of the counter 36 under the tension of spring 57.

The second recording lever 30, which serves for recording the speed of travel, is also pivotally and axially movably carried by means of its guide sleeve 67 on a rigid shaft 68 parallel to the record tape 35. The guide sleeve 67 of the recording lever 30 is linked by a link 69 to a two-armed lever 70, which turns on the rotatably carried stationary shaft 71 and has a forked arm 72 which engages by means of two pins of a driving ring an annular groove formed in the movable hub 4 of the pendulum governor. Thus the pendulum governor 2—4 can reciprocate the recording lever 30 on its guide member 68 for recording the speed curve. The recording lever 30 has connected to it a mechanism for controlling a pointer 73 so as to ensure a most highly linear pointer movement. This control mechanism comprises as the most important control element a toothed segment 74, whose teeth mesh with a gear 76 carried on the pointer spindle 75. This toothed segment 74 has an engaging pin 78, which is radially spaced from the segment shaft 77 and extends from the surface of the segment. A coil spring 82 accommodated in a recess of the plate bar 10 engages with one end the pointer spindle 75 and with the other end is affixed under initial stress to the plate bar 10. This spring 82 urges the engaging pin 78 against another engaging pin 79 on a bell-crank lever 81, which is pivotally movable on a stationary shaft 80. The circular path of the stop 79 of the bell-crank lever is at right angles to the circular path of the stop 78 on the segment. Thus one stop will slide along the other during the rotation of the toothed segment 74 and the point of contact between the two engaging pins 78, 79 will perform a resultant movement in the direction of a chord. Moving within an angle of, e. g., 90 deg. the toothed segment 74 transmits its movement with a corresponding transmission 76 to the pointer spindle 75 to turn the same through an angle of about 120 deg. When the engaging pin 78 of the toothed segment 74 and the pointer 73 are in their initial positions the pin 78 is maximally spaced from the longitudinal centre plane 83 extending through the shafts 77 and 80. Depending on the lift of the pendulum governor the bell-crank lever 81 will move the pin 78 towards and beyond that longitudinal centre plane 83. The engaging pin 78 slides along the arm of the bell-crank lever 81 during that movement thereof. As the engaging pin 78 approaches or departs from said longitudinal centre plane the effective length of that lever arm is reduced or increased, respectively. As a result the angle of deflection of the bell-crank lever 81 is transmitted by the engaging pin 78 with a ratio of 1:1 when the latter is adjacent to the longitudinal centre plane and with an increased ratio when the pin is adjacent to its upper and lower end positions. Only this arrangement of the engaging pin 78 enables such a correction of the angle of deflection of the pendulum governor—that angle is relatively small at lower and highest speeds—that the pointer 73 will be deflected particularly in the lower speed range practically through the same angle as in the intermediate speed range, where the angle of deflection is not and need not be corrected. Thus the series arrangement of the control elements 67—83 provides for an equalization of the control movement of the pendulum governor in the lower speed range and for an almost linear movement of the pointer throughout the scale. The correct setting of this engaging pin 78 can be obtained either by changing the position of the pin on the segment 74 or by changing the toothed mesh of the segment with the pinion 76 of the pointer spindle 75. A pin 84 extending from the second arm of the bell-crank lever 81 engages the sleeve 67 of the speed recording lever 30, which is actuated by the two-armed lever 70, whose fork 72 engages the movable hub 4 of the pendulum governor.

The device described shows that the drive acting through the shaft 3, the worm gear 11, 12 and the control members 87 operates the two recording elements 29, 30 for a dotwise recording in intervals of time depending on the speed of travel, but always after predetermined distances travelled, and rotates the pendulum governor 4—8, whereas the movement of the speed recording lever 30 along the guide 68 is effected only by the control action of the pendulum governor. The pendulum governor is lifted in dependence on the speed to deflect the two-armed lever 70, which causes a corresponding deflection of the recording lever 30 parallel to itself on its axis 68. The recording lever 30 moves by means of the bell-crank lever 81 the toothed segment 74, which effects an almost linear movement of the pointer 73 by means of the gear 76 carried on the pointer spindle 75. At the same time the travel recording lever 29 is moved up and down parallel to itself on its shaft 37 by the lever arm 40; this control movement depends on the speed of rotation and on the size of cam 46. Both recording levers 29, 30 are controlled by the control lever 27, which is coupled to them by the hooks 31, 32 and the driving rod, for movement towards the record tape 35. This control lever 27 is moved together with the recording levers 29, 30 into a cocked position against the force of spring 28 by the pawl 20 controlled by the drive 3, and is suddenly released from that position when the driving tooth of the pawl 20 slides off. Then the control lever 27 and the two recording levers 29, 30 will suddenly move forward under spring pressure to impinge for a short while on the ink ribbon 34 and the paper tape 35 behind the same. Thus the recording of a dot by each recording lever 29, 30 has been completed. After the impact the recording levers 29, 30 and their control lever 27 spring back immediately into their initial position, in which the nibs are spaced from the ink ribbon.

To indicate that a certain maximum speed prescribed by the police is exceeded it may be most favourable to mark a limit at that point by providing the ink ribbon 34 with two longitudinal stripes in different colours, e. g. black and red, the black-coloured stripe serving for recording the speed permitted by the police and the red-coloured stripe serving for indicating the higher speed. Since these speed limits are widely different in various countries it is suggested that the entire guide means for the ink ribbon be arranged so as to be slidable in the axial direction of the ink ribbon reels relative to the guide means 35 for the record tape. To this end the ink ribbon reels 85, 86 are axially slidable on their shafts 87, 88 and can be fixed in their adjusted position, e. g., by a headless screw. Besides, the two cheeks 90, 91, which provide for a lateral guidance of the ink ribbon in the recording area and leave between them a gap 89, are adjustable and can be fixed in position at the casing webs 92, 93 connecting the two plate bars 9, 10. Thus the position of the ink ribbon 34 relative to the record tape 35 can be fixed at any time and is secured by lateral stops on the cheeks to prevent a lateral deviation of the ink ribbon from its position. The entire guide mechanism of the ink ribbon including the guide cheeks 90, 91 may be combined in a block, which can be inserted as a completely assembled unit between the plate bars 9, 10 and can be adjusted as a whole. The two plate bars have two connecting webs designated 94, 95, 92 and 93 and arranged to combine the two plate bars 9, 10 so as to form a stable gear frame.

The ink ribbon is automatically advanced after each dot record by a special advancing mechanism operated by the gear 11, 12. This operation has not been considered here and for this reason is not shown in the drawing.

I claim:

1. In a device for indicating the speed of travel of motor vehicles: a casing having two spaced parallel plate bars formed with bores, a pendulum governor rotatably carried in said bores, a transmission for connecting said governor to a road wheel of a vehicle, a speed indicator carried at one side of said casing and comprising a scale and a pointer movable relative to said scale, a pointer shaft carrying said pointer, a pinion fixed on said pointer shaft, a toothed segment rotatably connected to one of said plate bars and in mesh with said pinion, a control pin carried by said toothed segment eccentrically with respect to the axis of rotation of said segment and extending from said segment, a spring arranged to urge said control pin, segment, and pointer into an initial position, and a control lever having a pin slidably engaging said control pin, said control lever being connected to and responsive to said governor to move said control pin and toothed segment against the force of said spring to cause a substantially linear deflection of said pointer in dependence on the swing of said governor.

2. In a device for indicating the speed of travel of motor vehicles: a casing having two spaced parallel plate bars formed with bores, a pendulum governor rotatably carried in said bores, a transmission for connecting said governor to a road wheel of a vehicle, a speed indicator carried at one side of said casing and comprising a scale and a pointer movable relative to said scale, a pointer shaft carrying said pointer, a pinion fixed on said pointer shaft, a toothed segment rotatably connected to one of said plate bars and in mesh with said pinion, a control pin carried by said toothed segment eccentrically with respect to the axis of rotation of said segment and extending from said segment, means for adjustably fixing said control pin to said segment on a circle which is concentric to the axis of said segment, a spring arranged to urge said control pin, segment, and pointer into an initial position, and a control lever having a pin slidably engaging said control pin, said control lever being connected to and responsive to said governor to move said control pin and toothed segment against the force of said spring to cause a substantially linear deflection of said pointer in dependence on the swing of said governor.

3. In a device for indicating the speed of travel of motor vehicles: a casing having two spaced parallel plate bars formed with bores, a pendulum governor rotatably carried in said bores, a transmission for connecting said governor to a road wheel of a vehicle, a speed indicator carried at one side of said casing and comprising a scale and a pointer movable relative to said scale, a pointer shaft carrying said pointer, a pinion fixed on said pointer shaft, a toothed segment rotatably connected to one of said plate bars and in mesh with said pinion, a control pin carried by said toothed segment eccentrically with respect to the axis of rotation of said segment and extending from said segment, a spring arranged to urge said control pin, segment, and pointer into an initial position, and a control lever having a pin slidably engaging said control pin, said control lever being connected to and responsive to said governor to move said control pin and toothed segment against the force of said spring to cause a substantially linear deflection of said pointer in dependence on the swing of said governor, said control pin being adjustable relative to said pointer by changing the mesh of said toothed segment with said pinion.

References Cited in the file of this patent

UNITED STATES PATENTS

| | | |
|---|---|---|
| 949,000 | Maxwell | Feb. 15, 1910 |
| 1,101,840 | Foote | June 30, 1914 |
| 1,277,359 | Barrett | Sept. 3, 1918 |
| 1,385,342 | Bruhn | July 19, 1921 |